PATENT OFFICE.

OTTO BEST, CHARLES S. ASH, AND EDGAR SAMSON, OF SAN FRANCISCO, CALIFORNIA.

BAKING-POWDER AND PROCESS OF MAKING THE SAME.

No. 856,672.     Specification of Letters Patent.     Patented June 11, 1907.

Application filed June 14, 1905. Serial No. 265,154.

*To all whom it may concern:*

Be it known that we, OTTO BEST and CHARLES S. ASH, citizens of the United States, and EDGAR SAMSON, a subject of the King of Great Britain, residing at San Francisco, in the county of San Francisco and State of California, have invented certain new and useful Improvements in Baking-Powder and Processes of Making the Same, of which the following is a specification.

Several acids and acid salts, as for instance, tartaric acid, citric acid and some phosphates, have many desirable qualities as ingredients in baking powder, but have heretofore not been used to any considerable extent on account of the baking powder made of the ingredients being too unstable, due to their solubility and also on account of its being too rapid in its action, from the same cause, performing the leavening process too quickly to make a desirable finished product.

The object of the present invention is to provide a baking powder in which such ingredients may be used, which shall yet be stable and which will be slow in its action, thus permitting the dough to rise slowly and gradually.

To accomplish this object we take either one or both of the active constituents of the baking powder, either by itself or commingled with the filler, and coat the same with a neutral, soluble substance, which is rendered insoluble (in water) by the application of heat. This film, which is now insoluble, will, under ordinary circumstances, not be affected by the moisture of the air, and will thus separate the active constituents and prevent chemical reaction between them. The addition of the filler renders the process easier to work. The substance, that we find most suitable for this purpose is albumen, either animal or vegetable and as it is neutral can be applied equally well for the coating of the alkaline or the acid constituent.

Supposing the acid ingredient to be tartaric acid and the filler starch, then, in carrying out our process, we first add to the necessary quantity of tartaric acid alone, or to a mixture of tartaric acid and starch, the necessary quantity of albumen in a solution concentrated enough to impart to the tartaric acid, or the mixture of tartaric acid and starch, only so much moisture, as to produce a semi-dry mixture, not pasty, but not perfectly dry. In this way the surface of each individual grain of tartaric acid or tartaric acid and starch is enveloped by a wet soluble film made of albumen. By drying the ingredient, so prepared, at a low temperature, a dry soluble film is formed. This film is coagulated or rendered insoluble by heating to 212 degrees Fahrenheit, thus forming a dry insoluble film of albumen around the particles of the tartaric acid or tartaric acid and starch. The alkaline instead of the acid ingredient of the baking powder may thus be cased, or each ingredient may be coated separately and afterward mixed.

In the use of this baking powder the thin film of albumen, thus coagulated upon the particles of one or all of the ingredients, is not dissolved by the action of hot or cold water, but is mechanically detached when a sufficient quantity of water is permitted access thereto. It is an important feature of the present invention that the removal of the film takes place gradually, permitting the baking powder to perform its function slowly and in proportion of the raising of the temperature.

It is a desired advantage in the use of all baking powders that the escape of the gas should be slow and substantially continuous with the baking process, thus permitting the dough to rise slowly and gradually, and this is accomplished by our invention.

We claim:—

1. The process of making baking powder which consists in adding to one of the active ingredients a solution of albumen, then thoroughly commingling and drying at a low temperature the mixture so formed to form around the individual particles albuminiferous films, then raising the temperature to coagulate the albumen in the films around the individual particles and thereby render said films insoluble, and then mixing with the other active ingredient in the usual manner, substantially as described.

2. The process of making baking powder which consists in adding to tartaric acid a solution of albumen, then thoroughly commingling and drying at a low temperature the mixture so formed to form around the individual particles albuminiferous films, then raising the temperature to coagulate the albumen in the films around the indicles and thereby render said films
nd then mixing with the other
edient in the usual manner, sub-
s described.
ing powder having the particles of
gredients coated with a dry, insol-
and mechanically detachable by
of water.
ing powder having the particles
its ingredients coated with an
rous dry, insoluble film, and
mechanically detachable by the action of water.

In witness whereof we have hereunto set our hands in the presence of two subscribing witnesses,

OTTO BEST.
CHARLES S. ASH.
EDGAR SAMSON.

Witnesses:
FRANCIS M. WRIGHT,
BESSIE GORFINKEL.